UNITED STATES PATENT OFFICE.

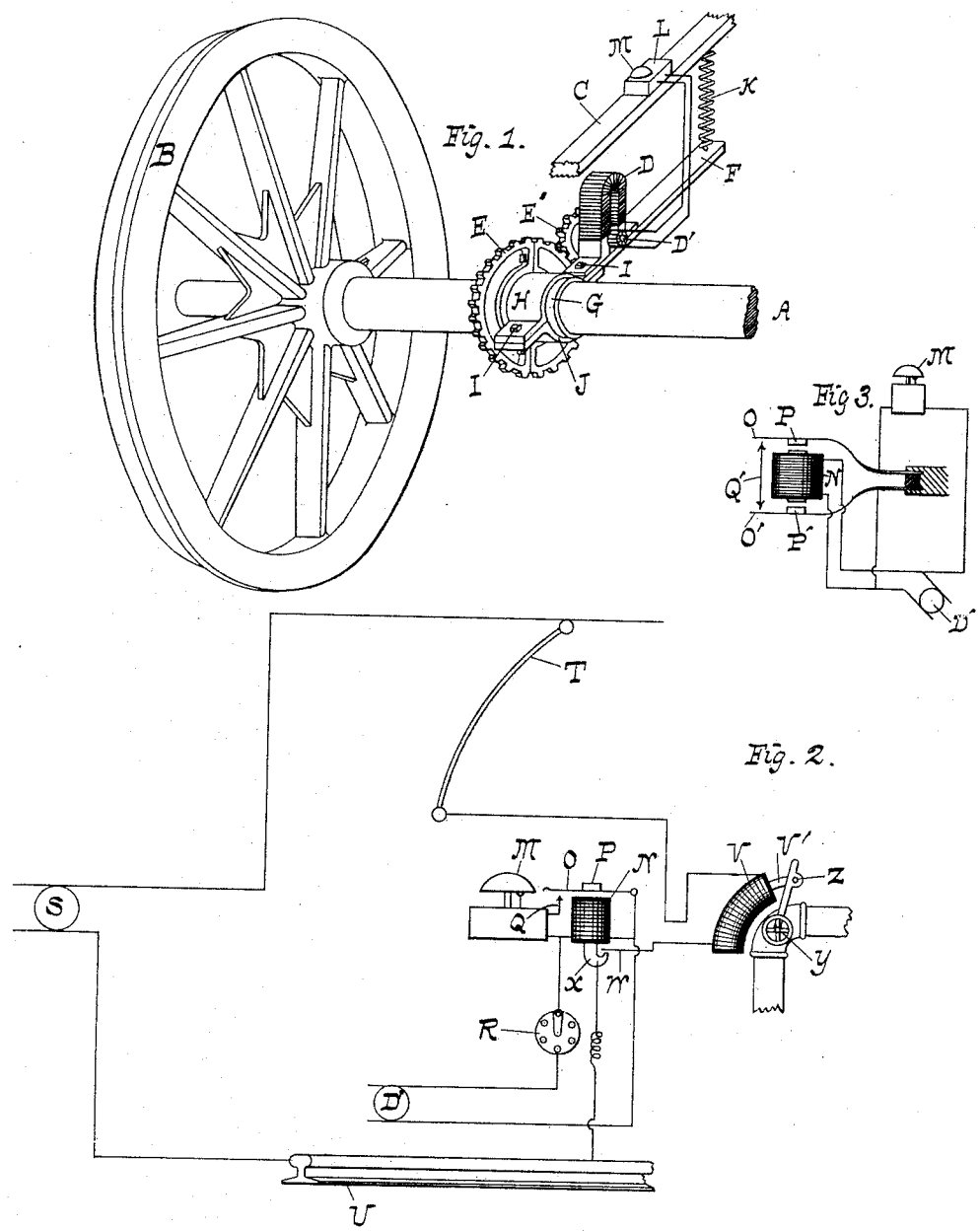

OTTO E. HAUSBURG, OF NEW YORK, N. Y.

STREET-CAR SPEED-INDICATOR.

SPECIFICATION forming part of Letters Patent No. 622,351, dated April 4, 1899.

Application filed March 21, 1895. Serial No. 542,587. (No model.)

*To all whom it may concern:*

Be it known that I, OTTO E. HAUSBURG, a subject of the German Emperor, and a resident of New York, county and State of New York, have invented certain new and useful Improvements in Street-Car Speed-Indicators, of which the following is a specification.

In the operation of street-cars it has become necessary in many cities to establish laws for fixing a maximum speed at which a car shall travel. I am aware that attempts have been made for automatically indicating to the motorman by some kind of a signal that the greatest speed permitted has been reached; but I believe that the apparatus herein described is not only novel over the state of the art, but that it also possesses great advantages, which will become apparent from the following description.

Figure 1 is a perspective view of so much of a car as is necessary for explaining the operation and the mechanical construction of the apparatus comprising my invention. As the electric circuits are not sufficiently traceable, Fig. 2 is added, the same being a diagram of the electric circuits and also including a modification of the invention; and Fig. 3 is a diagram of a modification.

A is the axle, B the wheel, and C a portion of the truck, of a street-car, whether electric, horse, steam, or cable.

D is a small dynamo driven by the axle A. It should be understood that this is not an electric motor and that it is not in circuit with the trolley or with a generator or any source of power. When driven by the axle, it generates an electric current. The means for driving the dynamo D, as indicated in the drawings, consists of a split spur-wheel E, bolted fast upon the axle D. Upon the axle of the dynamo D is a pinion E', which gears with the wheel E, so that when the axle rotates the dynamo D is operated. The radial arm F has for its pivot the axle A, and for the purpose of preventing longitudinal movement of the arm along the axle the wheel E serves as one fixed collar or shoulder, while the ring G serves as the other shoulder. The rod F, having one end curved around the axle A at H, is bolted by bolts I to a similarly-curved piece J, so as to make a hole through which extends the axle A. In view of the dynamo D being mounted upon the arm F the center of the pinion E' is always at approximately the same distance as that of the wheel E, and the arm F is supported at the opposite end from the axle A by a spring K, suspended from the truck C. The irregular motions of the car may cause the distance between the truck C and the axle A to vary and therefore to move the arm F up and down, and yet the gearing will be operated.

At any convenient place upon the car or truck or axle is mounted the box L, provided with an electric bell M and also containing a magnet N, circuit-closer O, and armature P, attached to the circuit-closer. These elements are shown out of the box in Fig. 2. The commutator of the dynamo D is lettered D'.

The circuits may be understood by referring to Fig. 2, where the commutator D' is shown. This commutator is permanently in a closed circuit with the magnet N. The circuit-closer O is a spring, and in the path of this spring is a contact Q, so that when the magnet N is powerful enough to attract the armature P to close the circuit at Q the magnet N is thereby short-circuited and practically all the current from the dynamo D goes through the electric bell M. R is a rheostat in circuit with the magnet N. This rheostat or else the spring forming the circuit-closer O or else the magnet N must one and all be of such dimensions by means of predetermined construction or adjustment that the circuit of the electric bell N will not be closed until the car is moving at a predetermined rate of speed. These conditions may be obtained by running the car, say, at the maximum rate permitted, which is, for example, six miles per hour, and then adjusting the rheostat so that the bell N will just be set ringing, or the rheostat may be adjusted so that practically no current is cut down by it, and the spring O may be chosen of such an elasticity that the magnet N will close the circuit at Q when the car is going at the said rate of six miles per hour, or the rheostat and the spring or circuit-closer O may be adjusted indiscriminately within reasonable limits, and the magnet N may be so wound or so distanced from the armature P that the bell will just ring when the car is going at six miles an hour, and therefore it will always begin to ring when the car attains that speed, and therefore the passengers, the people on the street, and the motorman will know that the car should be slackened in its speed.

It has been noticed that motormen become accustomed to automatic signals very often or become neglectful of obedience to the warning of the signal, or may be partly deaf, or the signal may be neutralized in its sound by other sounds, and therefore I have provided a modification of the invention, as set forth in Fig. 2, where S is the generator, in this case a dynamo, furnishing a current through a trolley T and through the rail U for the purpose of driving the car. I provide a solenoid V in a circuit with the generator S, open at the contact W, which is in the path of a movable core X, which is electrically connected to the generator S, so that when the magnet is energized in the manner already explained the solenoid V is thrown into a closed circuit, because contact is made between the terminals W and X.

$y$ is a device which typically represents means for applying the brake of the car. Specifically it is a valve which controls the application of an air-brake, and it is connected with the core V' of the solenoid V by means of a pivot Z, so that when the solenoid V is energized it partly closes the air-brake valve and slackens the speed of the car when the dynamo D generates a predetermined electromotive force.

In practice the shaking of the car or truck, especially after the armature P was drawn very close to the magnet N, would cause a closing of the signal-circuit accidentally before the car had reached the predetermined speed. Means for preventing this occurrence is shown in Fig. 3, where the magnet N operates two circuit-closers having a common contact, so that the circuit must be closed at two points at the same time before the bell M will ring. The details are as follows: At the ends of the magnet N are armatures P and P', adapted to be attracted and carried on circuit-closers O and O', in the path of which is a contact Q'. The circuit-closers are arranged with practically a common fulcrum and of about the same elasticity and length of swing, so that if one is vibrated by the car the other will vibrate in the same direction, so that both will seldom, if ever, touch the contact Q' simultaneously, and if they do it will be only for an instant. Nevertheless, when the current has reached the predetermined electromotive force the circuit will be closed.

I claim as my invention—

1. A speed-indicating apparatus for vehicles, consisting of a dynamo driven by the vehicle, a relay-magnet in the circuit of the dynamo, an armature therefor adjusted to respond at a predetermined speed of the dynamo, and a local circuit containing a signal-magnet arranged to be actuated by the armature.

2. An automatic brake system for vehicles, consisting of the combination of a dynamo whose electromotive force is proportional to the speed of the vehicle, a braking device, and means for automatically applying the brake only when a predetermined electromotive force of the said dynamo has been obtained.

3. A speed-indicator system for vehicles, consisting of the combination of a dynamo whose electromotive force is proportional to the speed of the vehicle, an electric signal, and an electric brake-applying device, and means for automatically operating the signal and the brake-applying device only when a predetermined electromotive force is reached.

4. The combination with a car-axle, of a loose collar having an extension, a dynamo mounted upon the extension and driven by the axle, an elastic connection between the extension and the truck of the car, a magnet permanently in a closed circuit with the said dynamo, an electric signal normally in an open circuit with said dynamo, an electric braking device in an electric circuit, and armatures within inductive action of the said magnet and controlling the circuits of the electric signal and an electric brake-applying device.

5. A speed-indicator system for vehicles, consisting of the combination of a dynamo driven by the vehicle, a magnet permanently in circuit with the dynamo, an electric signal, and independent circuit-closers having a common contact-conductor in series with the circuit-closers which are normally open and in circuit with said signal and which are controlled by the said magnet.

6. A speed-indicator system for vehicles, consisting of the combination of a dynamo driven by the vehicle, an electric signal, independent circuit-closers in series circuit with each other and normally open, and means for closing both of the circuit-closers only when a predetermined electromotive force is generated by the dynamo.

In testimony that I claim the foregoing as my invention I have signed my name, in presence of two witnesses, this 20th day of March, 1895.

OTTO E. HAUSBURG. [L. S.]

Witnesses:
  WILLIAM R. WARREN,
  EMMA C. DEGHUEE.